United States Patent [19]

Hayner

[11] Patent Number: 4,842,903

[45] Date of Patent: Jun. 27, 1989

[54] WAX, SULFONATE, DISPERSING OIL, SEPIOLITE CLAY COMPOSITIONS FOR PROTECTIVE SOFT COATINGS

[75] Inventor: Roger E. Hayner, Flatwoods, Ky.

[73] Assignee: Ashland Oil, Inc., Ashland, Ky.

[21] Appl. No.: 180,429

[22] Filed: Apr. 12, 1988

[51] Int. Cl.$^4$ ............................ B32B 9/00; B05D 1/02
[52] U.S. Cl. .................... 427/428; 106/14.05; 106/14.43; 106/14.29; 427/429; 427/435; 427/443; 428/467; 428/470
[58] Field of Search ............... 106/14.05, 14.43, 14.29; 427/435, 428, 429, 388.4, 443; 252/28; 428/467, 470

[56] References Cited

U.S. PATENT DOCUMENTS

| | | | |
|---|---|---|---|
| 4,650,692 | 3/1987 | Hayner | 106/14.27 |
| 4,718,942 | 1/1988 | Laura et al. | 106/14.43 |
| 4,729,791 | 3/1988 | Laura et al. | 106/14.29 |

Primary Examiner—Theodore Morris
Attorney, Agent, or Firm—Richard C. Willson, Jr.

[57] ABSTRACT

Corrosion preventives, e.g. for automobiles, comprise sepiolite clays with waxes, sulfonates e.g. SACI, optional solvents, oils, soaps provide high viscosity, high solids, corrosion-preventatives. Application can be by hot spray or hot melt, hot dipping, and other standard techniques. The sepiolite clays provide excellent anti-sag capabilities to the dry films without excessively increasing the viscosity of the coating material. Conventional thixatropes such as bentonites and other common organo clays usually drastically increase product viscosity and complicate pumping at room temperature.

14 Claims, 3 Drawing Sheets

SECONDARY SAGGING VS. FILM THICKNESS
24 HOUR DRYTIME

△ = EXAMPLE 2 - COMP (NO CLAY)
○ = EXAMPLE 1 - INV (SEPIOLITE)
□ = EXAMPLE 4 - COMP (BENTONITE)

SECONDARY SAGGING VS. FILM THICKNESS
24 HOUR DRYTIME

△ = EXAMPLE 2 - COMP (NO CLAY)
○ = EXAMPLE 1 - INV (SEPIOLITE)
□ = EXAMPLE 4 - COMP (BENTONITE)

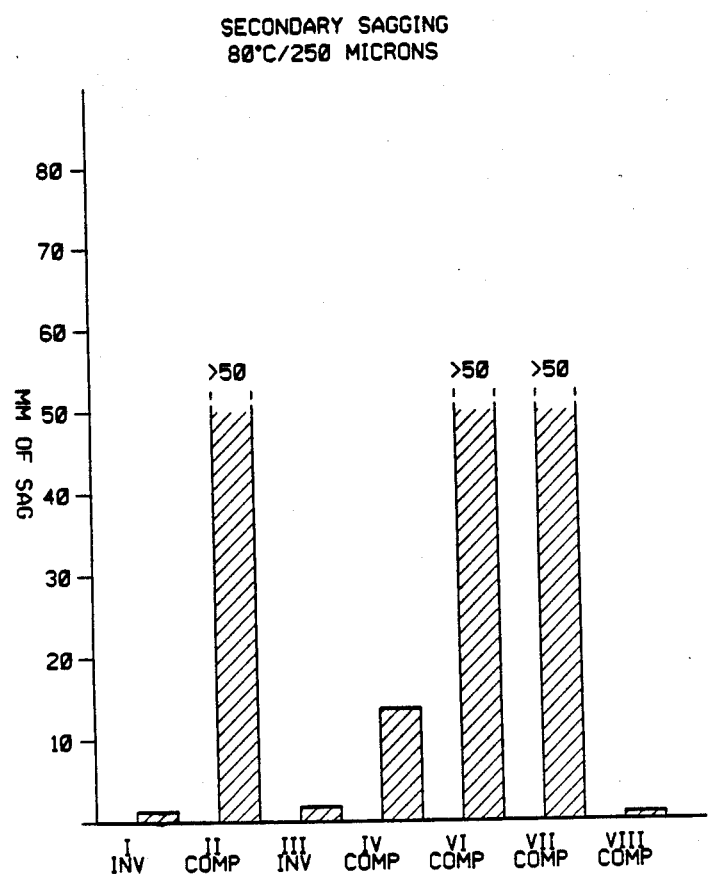

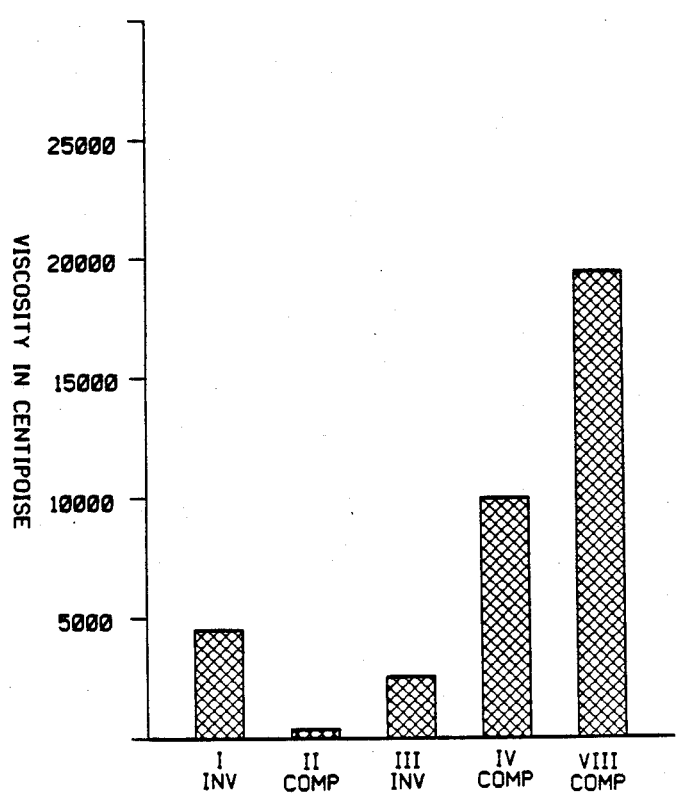

WAX, SULFONATE, DISPERSING OIL, SEPIOLITE CLAY COMPOSITIONS FOR PROTECTIVE SOFT COATINGS

CROSS REFERENCE TO RELATED APPLICATIONS

The present application discloses compositions and techniques related to U.S. Pat. No. 4,650,692.

BACKGROUND OF THE INVENTION (1) Field of the Invention

The present invention relates particularly to organic coating compositions and methods for their use generally classified in Class 106.

(2) Description of Prior Art

U.S. Pat. No. 3,746,643 to Rogers (Conoco) discloses compositions comprising sulfonates and microcrystalline waxes for protective coatings.

U.S. Pat. No. 4,491,535 to Carlos and Friley (Ashland) teaches hydrocarbon oxidate compositions comprising the reaction products of (a) hydrocarbon oxidates or their metal salts with; (b) polyamines; and (c) copolymer(s) of olefin and a comonomer of an unsaturated carboxylic acid or a vinyl ester of a saturated carboxylic acid and further comprising a wax oxidate, a petrolatum oxidate or mixtures. Such products have very high viscosity and sinewy characteristics. These "oxwax" products can be employed in the compositions of the present invention in whole or partial replacement for the preferred lanolin fatty acid.

U.S. patents on the preferred organic sulfonates discussed in this application include: the aforementioned U.S. Pat. No. 3,746,643 to Rogers (Continental); U.S. Pat. No. 3,372,115 to McMillen (Lubrizol);U.S. Pat. No. 3,242,079 to McMillen (Lubrizol); U.S. Pat. No. 4,260,500 to Forsberg (Lubrizol); U.S. Pat. No. 4,253,976 to Forsberg (Lubrizol).

Sepiolite clays have been used in many compositions including Japanese No. 85136132 (Onoda Cement), anti-sag coating for concrete; Japanese No. 84198952 (Toyota), water soluble paint coatings; JP No. 62072769 (Toyota), paints for high water resistance; JP No. 8568115 (Hoechst), synthetic resin emulsion coatings; JP No. 8419883 (Toyota), water base paints; JP No. 61076560 (Toyota), water-soluble paint compositions; JP No. 61066764 (Toyota), water or solvent based coatings; JP No. 61044959 (Toyota), solvent-based alkyd coatings; JP No. 60204659 (Toyota), water based silicate coating compositions; JP No. 8195633 (Fuji), clear coating compositions; JP No. 62072769 (Toyota), water resistant solvent based paint; JP No. 60223855 (Teijin), non-flammable ester flame retardant compositions; JP No. 60063253 (Toshiba), phenolic resin solvent-based molding compositions; and numerous others of which the above are thought to be reasonably typical.

None of the above prior art teaches the discovery of the present invention that the combination of paraffin and/or microcrystalline wax plus alkali metal or alkaline earth metal sulfonates, diluent oils, alkaline earth soaps of lanolin fatty acids with the addition of sepiolite clay exhibits excellent corrosion protective qualities combined with excellent anti-sag film-forming ability, and the further advantage of being readily pumpable at room temperature.

SUMMARY

1. General Statement of the Invention

The present invention embodies processes and methods for corrosion preventive compositions which comprise, in combination, waxes having melting points in the range of about 50°-100° C., organic sulfonates of alkali earth or alkaline earth metals, sepiolite clays which have proven to be dramatically superior to their conventional counterparts, e.g. bentonite for the purposes of the present invention, carboxylic acids soaps of alkaline earth or alkaline earth metal together with diluent oils and organic solvents as necessary.

2. Utility

The present invention is valuable for a wide variety of purposes to which protective coatings can be put including without limitation, protection of structural metals, vehicles, electrical components, telecommunications devices and other surfaces.

BRIEF DESCRIPTION OF THE DRAWINGS

FIG. 2 is a bar graph showing secondary sagging, a number of the Examples including two according to the invention and several comparatives.

FIG. 3 is a bar graph showing viscosity at 50° C. for the invention and for a variety of conventional compositions using anti-sag agents other than sepiolite clay. Note the objectionable increase in viscosity caused when other anti-sag agents are utilized in quantities sufficient to prevent sagging.

DESCRIPTIONS OF THE PREFERRED EMBODIMENTS

Starting Materials

Figure 1:
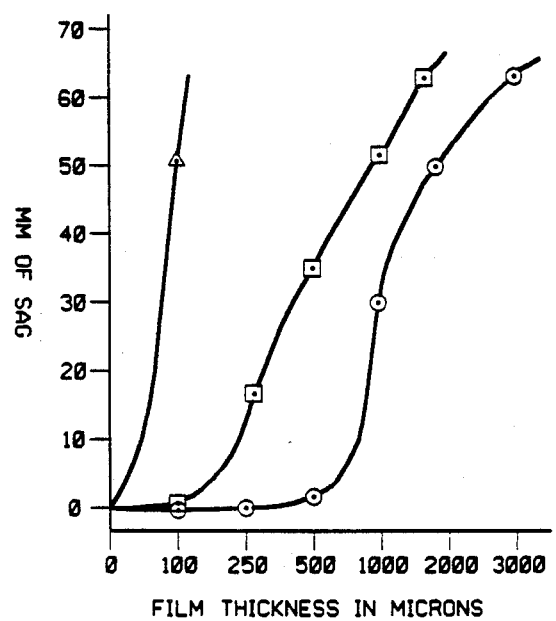
FIG. 1 is a line graph showing secondary sagging (the run down of paint sprayed on the upper section of an otherwise uncoated panel) versus film thickness for the invention and for comparative conventional formulations.

Waxes:

Preferably the compositions of the present invention will include refined paraffin or microcrystalline wax which contains less than 0.1 to about 5, and more preferably 0.1 to about 3 weight percent oil based on the weight of the wax combined with esterified waxes through other types of wax may occasionally be substituted for specialized applications. Preferred wax melting points will be above 50° C. (122° F.), more preferably from 60° C. to 100° C. (140° F. to 212° F.), and most preferably from 65° C. to 90° C. (150° F. to 194° F.). Such micro waxes can be naturally derived, e.g. those manufacctured in the processing of petroleum crude oils, or synthetically manufactured, e.g. polyolefin waxes such as polyethylene or polypropylene waxes. The average molecular weight of the waxes useful in the present invention should be selected so as to provide good film formation and permanence but molecular weight is not narrowly critical and will be easily selected by those skilled in the art.

Also, the degree of branching in the wax molecules should be selected so the average degree of crystallinity permits the wax to be easily dispersed and to be compatible with the other ingredients of the particular formulation being produced. Chain branching provides sites for esterification in the case of oxygenated waxes; these are also suitable for use in most applications with the present invention. Oxygenated waxes (oxwax) will preferably have an acid number in the range of from about 5 to about 200, most preferably from 15 to about 50. The wax can contain at least 50% essentially saturated wax based on the total weight of the wax.

Specific waxes useful for the present invention include: natural waxes, such as a semi-refined paraffin available from Shell Oil of Houston; petrolatum, widely available; synthetic waxes, such as polyethylene waxes available from Bareco Corporation of Tulsa, Okla. or the Epolene brand available from Eastman Kodak of Rochester, N.Y.; microwaxes such as "Multiwaxes" available from Witco Chemical, Sonneborn Division, New York, NY 10017, Shell Maxes available from Shell Oil of Houston, or Polywax 55 (Bareco) and Mobil Microwax 2305 (Mobil Oil); or oxygenated waxes, which can be readily manufactured in petroleum refineries utilizing well-known techniques, or those available from Durachem Corporation of Harrison, N.Y.

The amount of waxes to be utilized with the present invention is not narrowly critical and, in fact, for special applications, the wax can even be omitted with additional quantities of sulfonates described below being employed. For most formulations, the wax content will be from 0.5 to 30%, more prefrably from about 5 to 25%, and most preferably from about 5 to about 15% by weight.

All percents given herein are percents by weight based on the weight of the total formulation unless otherwise expressly stated.

Organic Sulfonates:

A particular feature of the present invention is the inclusion in the formulation of organic sulfonates. For best corrosion protection, it has been discovered that the preferred organic sulfonates are over-based (i.e., made with an excess of calcium or other metal carbonate). The most preferred type of organic sulfonate is the Severe Atmospheric Corrosion Inhibitor ("SACI") available commercially from Witco Chemical Company of New York, NY, described in the patents. These overbased sulfonates are the reaction products of an overbased metal salt of sulfonic acid with carbon dioxide, water and alcohols. They impart exceptional corrosion protection and mix well with the other components of the invention.

The preferable sulfonates are overbased with barium, calcium or sodium, and have sufficient equivalent weight to provide extended rust protection against corrosive environments. The preferable equivalent weights of these sulfonates, which are derived from alkyl benzene, are as follows when overbased with the following metal sulfonates; sodium sulfonate or a equivalent weight preferably 370 to 750, more preferably 400 to 650 and most preferably 450 to 600; barium sulfonate of a equivalent weight preferably 400 to 1,400, more preferably 700 to 1,300, most preferably 800 to 1,200; and calcium sulfonate to a equivalent weight preferably 370 to 850, more preferably 400 to 800, most preferably 500 to 750.

The organic sulfonates of the present invention will generally be employed in quantities of from about 1 to about 98%, more preferably from about 5 to about 50% and most preferably from about 15 to about 25% based on the total weight of the formulation.

Diluent Oils:

The formulations should preferably contain diluent oils which help to solubilize the formulations and which remain in the finished film to impart flexibility. Examples are: mineral lubricating oils obtained by and conventional petroleum refining procedures, synthetic lubricating oils e.g. polymers of propylene, polyoxyalkylenes, polyoxypropylene, di-carboxylic acid esters, phosphorus esters, etc. The viscosity will preferably be from about 100 to about 700, more preferably about 150 to 600, and most preferably about 300 to 500 SUS at 210° F.

From 5 to 60%, more preferably 10 to 50%, and most preferably 25 to 40% by weight of the diluent oil can be used.

Carboxylic Acids:

The carboxylic acids of the present invention are preferably saponified and added as carboxylic acid soaps of alkali metal or alkaline earth metals. Preferred are lanolin fatty acids having free fatty acids of 14 to 30% measured as oleic, also having specific gravity in the range of about 0.92 to about 0.98 and having melting point in the range of about 32°–48° C., and a saponification number in the range of about 90–150.

While lanolin fatty acids saponified with calcium hydroxide are most preferred for the purposes of the present invention, various substitutes may be utilized in special cases including "ox-waxes" and oxidized petrolatum produced according to the techniques of the aforementioned U.S. Pat. No. 4,491,535 to Carlos and Friley, or a blend of oleic acid with a soft petrolatum to form a synthetic "ox-wax".

Particularly preferred are "Barre Common Degras" available from Rita Chemical Corp., Box 556, Crystal Lake, IL 60014, or stero W-14 available from Southland Corp of Chicago, IL.

The formulation should contain from about 1 to 98%, more preferably 5–60%, and most preferably 10–40% by weight of the carboxylic acid.

Sepiolite Clays:

Sepiolite is a clay mineral of the Fullers Earth family. It is needle-like in structure and comprised mainly of magnesium and aluminum silicates. These clays are also known as "mountain leather" or "mountain cork" and operate by felt type meshing or their needle structure throughout the coating mixture to prevent sagging. Enhanced upon drying by shrinkage, interlocking needles tighten upon themselves to give a compact intermeshed structure virtually eliminating cleavage planes. This meshing imparts anti-sag properties to dry films of the inventive compositions without imparting excessive increases in viscosities, such as the increases normally incurred by the usage of common organo clays which have been amine-treated and require activators to promote development of gel structure and anti-sag ability.

Sepiolites have been used mainly as asbestos replacements, filtration mediums, and as driling mud enhancers.

Suitable sepiolite clays are available from Industrial Mineral Ventures of Las Vegas, Nev. From about 0.1 to 10.0, more preferably 1.0 to 7.0, and most preferably 2.0 to 5.0 percent be weight of the sepiolite clays are used in the compositions of the present invention.

Dispersants:

Succinimides such as those commonly known as oronite, OLOA 340R available from Chevron Chemical, San Francisco, are used as dispersants and as corrosion inhibitors in the invention.

While not absolutely necessary, the invention will often be enhanced by the presence of dispersants to more thoroughly mix the ingredients and ensure stability during shelf storage.

About 0 to 10, more preferably from about 0.5 to 8, and most preferably from about 1.0 to 5.0 parts by weight of the dispersant will be employed. The exact dispersant should be understod not to be narrowly critical, and most common dispersants used in petroleum oil products can be substituted.

Organic Solvents:

Several types of solvents can be employed with the invention including liquid hydrocarbon solvents, kerosene and mineral spirits.

The solvents of the present invention will generally be employed in quantities of from about 0.5% to about 85% or more, more preferably from about 2.5 to about 50%, and most preferably from about 5.0 to about 15.0% based on the weight of the total formulation. In addition to acting as a solvent, the solvent will usually be useful during the drying and curing process after application of the coatings composition of the present invention to substrates.

Pigments:

Optionally, pigments can be utilized to tint or color the finished coating. Preferred pigments are black, e.g. carbon black, and white, e.g. titanium dioxide, and brown, e.g. iron oxides.

Pigments can generally be used in the range from about 0.1 to 5% by weight based on the total weight of the formulation, but this is not narrowly critical.

Techniques in Mixing:

Apparatus: The apparatus for the present invention will be that conventionally utilized in the preparation of coatings compositions, e.g. kettles and mixing tanks having flow metering or measuring devices and agitation means, e.g. pumps mounted on side-arms connecting with the main vessel, internal stirrers, contra-rotating shearing devices and any of the other available devices which are well known to the art.

Temperature: The temperature during mixing may be different during different stages in the formulation. These temperatures are not narrowly critical and will vary to provide faster mixing or better compatibility of ingredients according to observation of those skilled in the art. For example, pressure vessels may be utilized for the purpose of lowering ingredient melting and boiling points, where useful, in order to provide better dispersion of difficult-to-mix ingredients.

Mixing Procedure:

The procedure for mixing is not narrowly critical and a typical procedure is set forth in Example 1.

Quality Control:

The finished formulation, prior to packaging, will generally be checked for viscosity, solids content, freeze-thaw stability, film build, spray ability, corrosion-protection under accelerated conditions and other tests utilizing techniques well known to the coatings industry.

Application:

The formulations of the present invention may be applied to substrates to be protected by conventional application techniques, such as spraying, brushing, dipping, flow-coating, airless spraying. Coating thickness can be varied by changing the formulation, the temperature, the number of coats, or the amount applied per coat, but in general will be in the range from about 2 to about 5 mils after drying.

Examples

EXAMPLE 1

(Formulation according to the invention providing corrosion protection and anti-sag properties)

To a conventional mixing kettle equipped with high shear rotary agitator are added, in order: 24.62 parts by weight of a stero W-14 lanolin fatty acid preheated to 150° F. for pourability, 35.89 parts by weight of Sun 500N naphthenic oil and mixture is heated with mixing to 240° F. Next is added 0.60 parts by weight of calcium hydroxide (D300 of Mississippi Lime Company). Once the saponification reaction is completed, indicated by the subsiding of the foaming formed during the neutralization, there is added 3.88 parts by weight of Shell Max 200, paraffin wax of 140° F. melting point, 4.85 parts by weight of Shell Max 500, microcrystalline wax having a 140° F. melting point, and 4.85 parts by weight of Shell Max 170 which is a microcrystalline wax having a melting point of 177° F., with agitation continuing. Once the waxes are completely melted and mixture is homogeneous, the entire mixture is pumped to a second mixing vessel containing 19.4 parts by weight of overbased calcium sulfonate sold under the tradename "SACI" by Witco Chemical Company of New York, N.Y., which has been preheated to approximately 150° F. and is continuously agitated during the addition. Then 2.91 parts by weight of OLOA 340R dispersant produced by Chevron Chemical Company is added and mixing continued until uniform. Cooling is then begun and the mixture is run through a Ross in-line homogenizer mounted on a recirculating side-arm until the temperature reaches about 100°–110° F., at which time 3.0 parts by weight of sepiotone clay from Industrial Mineral Ventures of Las Vegas, Nev. is added and dispersed under high shear until the composition is uniform.

The homogeneous batch is then sampled for quality control and the viscosity is found to be about 4,000–5,000 centipoises at 50° C. by Brookfield viscometer, using number 5 spindle at 10 rpm. Weight of solids is found to be about 90%.

The resulting product is tested for corrosion resistance and anti-sag qualities by applying to a cold rolled 1010 steel panel. After drying for 72 hours, the test panel is subjected to 5% salt (NaCl) spray at a temperature of 35° C. (95° F.) according to ASTM Test B-117. The test panel resists failure (greater than 5% corrosion) for over 1,000 hours.

A similar test panel coated with the formulation of this Example 1 resists over 1,000 hours of exposure to 100% relative humidity at 38° C. (100° F.) according to the techniques of ASTM D-2247.

When a similar sample as previously described is coated by the use of a Gardner Drawdown Bar with the above formulation and allowed to dry at room temperature (25° C., 77° F.) approximately 50% relative humidity, the coating is cured and soft but dry to the touch in about 2–4 hours.

The dry film thickness on the above test panel is approximately 3 mils (approximately 75 microns).

A similar 1010 cold rolled steel test panel is coated by dipping into the heated composition of this Example 1 to achieve 2–4 mils dry and allowed to cure 24 hours. The lower half of the test panel is scraped bare. The test panel is mounted vertically in an 80° C. (176° F.) test oven for 3 hours. Upon removal, the panel shows less than 2 millimeters of sagging as shown by run-down of the paint into the area which was scrapped bare. This test is generally according to the techniques of U.S. Military Specification MIL-C-11796B.

EXAMPLES 2–12

When various formulations are produced and tested according to the techniques of Example 1 but using the respective parameters set forth in Table I, the results are as described in Table I.

TABLE I
(Parts by Weight)

| Invention/Comparative Run No. | 1 INV B1641-49D | 2 COMP B1398-189A | 3 INV B1641-49C | 4 COMP B1641-42A | 5 INV B1641-58A | 6 COMP B1641-58B | 7 COMP B1641-49B | 8 COMP B1641-53B | 9 COMP B1641-50A | 10 COMP B1641-50B | 11 COMP B1641-44 | 12 COMP B1641-184B |
|---|---|---|---|---|---|---|---|---|---|---|---|---|
| Wax: | | | | | | | | | | | | |
| 140° F. MP Microcrystalline | 4.85 | 5.00 | 4.90 | 4.85 | 4.85 | 4.85 | 4.85 | 4.78 | 4.75 | 4.50 | 5.00 | 5.00 |
| 140° F. MP Paraffin | 3.88 | 4.00 | 3.92 | 3.88 | 3.88 | 3.88 | 3.88 | 3.82 | 3.80 | 3.60 | 4.00 | 4.00 |
| 177 Melt Point Microcrystalline | 4.85 | 5.00 | 4.90 | 4.85 | 4.85 | 4.85 | 4.85 | 4.78 | 4.75 | 4.50 | 5.00 | 5.00 |
| Carboxylic Acid: | | | | | | | | | | | | |
| Stero W-140 Lanolin Fatty Acid | 24.62 | | 24.87 | 24.62 | 24.62 | 24.62 | 24.62 | 24.23 | 24.11 | 22.84 | | |
| Barre Common Degras | | 25.38 | | | | | | | | | 25.38 | 25.38 |
| Oxidized Petrolatum | | | | | | | | | | | | |
| Organic Sulfonates: | | | | | | | | | | | | |
| SACI Ca Sulfonate | 19.40 | 20.00 | 19.60 | 19.40 | 19.40 | 19.40 | 19.40 | 19.10 | 19.0 | 18.00 | 20.0 | 20.0 |
| Lubrizol Ca Sulfonate 2094 | | | | | | | | | | | | |
| Alkali/Alkaline Earth Metals: | | | | | | | | | | | | |
| Calcium Hydroxide | 0.60 | 0.62 | 0.61 | 0.60 | 0.60 | 0.60 | 0.60 | 0.59 | 0.59 | .56 | 0.62 | 0.62 |
| Diluent Oils: | | | | | | | | | | | | |
| Sun 500N | 35.89 | 37.00 | 36.26 | 35.89 | 35.89 | 35.89 | 35.89 | 35.33 | 35.15 | 33.30 | 37.00 | 37.00 |
| Dispersants: | | | | | | | | | | | | |
| OLOA 340R | 2.91 | 3.00 | 2.94 | 2.91 | 2.91 | 2.91 | 2.91 | 2.87 | 2.85 | 2.70 | 3.00 | 3.00 |
| Anti-Sag Agents: | | | | | | | | | | | | |
| Sepiolone | 3.00 | | 2.00 | | 3.00 | 3.00 | | | | | | |
| United Catalyst YPA-1 | | | | | | | 3.0 | | | | | |
| Thixagel VP | | | | 2.0 | | | | 3.0 | | | | |
| Ircogel 900 | | | | | | | | | 5.0 | 10.0 | | |
| Thixatrol-ST | | | | | | | | | | | | |
| Anti-Sag Activators: | | | | | | | | | | | | |
| Propylene Carbonate | | | | 0.5 | | | | 0.75 | | | | |
| Water | | | | 0.5 | | | | 0.75 | | | | |
| Test Results: | | | | | | | | | | | | |
| Storage Stability | pass | pass | pass | pass | pass | pass | pass | pass | pass | pass | pass | pass |
| Viscosity Centpoise | 4400 | 360 | 2600 | 10,000 | 4100 | — | 1200 | 19,200 | — | — | 320 | 520 |
| Film Integrity | smooth | smooth | smooth | smooth | smooth | smooth | smooth | smooth | smooth | smooth | smooth | smooth |
| Dry Time Hours | 2-4 | 2-4 | 2-4 | 2-4 | 2-4 | 2-4 | 2-4 | 2-4 | 2-4 | 2-4 | 2-4 | 2-4 |
| Salt Spray Hours | 1000+ | 1000+ | 1000+ | — | 1000+ | — | — | — | — | — | 1000+ | 1000+ |
| Film Thickness (mils) | 2.5 | 2.5 | 2.5 | 2.5 | 2.5 | 2.5 | 2.5 | 2.5 | 2.5 | 2.5 | 2.5 | 2.5 |
| Humidity, Hours | 1000+ | 1000+ | 1000+ | — | 1000+ | — | — | 0 | — | — | 1000+ | — |
| Secondary Sag (mm) | 0 | >50 | 0-1 | 13 mm | 0-1 | >50 | >50 | very poor | >50 | >50 | >50 | >50 |
| Pumpability at 25° C. | good | good | good | poor | good | — | — | — | — | — | good | good |

MODIFICATIONS

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

For example, many optional ingredients e.g. dyes, long oil alkyds, etc. can be added to meet special requirements; the diluent oil can be increased so that no organic solvent is needed to provide proper viscosity in the final formulation.

Reference to patents and other literature made in the specification is intended to result in such patents or literature being expressly incorporated herein by reference including any patents or other literature cited within such documents.

What is claimed is:

1. Corrosion preventive compositions comprising, in combination:
   a. waxes having melting point of about 50°–100° C. and an oil content of about 0.1–5.0 wt.%;
   b. organic sulfonate of an alkali metal or alkaline earth metal;
   c. sepiolite clays present from about 0.1–10% by weight;
   d. carboxylic acid soap of an alkali metal or alkaline earth metal;
   e. diluent oil having a viscosity in the range of about 60–800 SUS;
   f. organic solvent in quantity necessary to provide desired viscosity.

2. A composition according to claim 1 in which the carboxylic acid soap is prepared by saponification reaction of calcium hydroxide with acid-containing materials.

3. A process according to claim 2 wherein the acid-containing materials are selected from the group consisting of Degras, lanolin fatty acids, oxidized petrolatums, microcrystalline waxes, paraffinic waxes, oxidized polyethylenes, and fatty acids.

4. A composition according to claim 3 wherein the acid-containing compound has a total acid number of about 25 to 50.

5. A composition according to claim 1 wherein said wax is present in about 0.5 to 50 parts by weight, said organic solvent is present in about 0.5 to 90 parts by weight, said carboxylic acid soap is present in about 0.5 to 50 parts by weight, said sepiolite clay is present in about 0.5 to 25 parts by weight, and said oils are present in about 0.5 to 60 parts by weight.

6. A composition according to claim 1 additionally comprising from about 0.5 to 5 parts by weight of a succinimide dispersant.

7. A method of producing an anti-corrosive, storage stable, rapid set, solvent reducible and dispersible coating composition capable of application and flow on a solid substrate, comprising the following steps:
   a. mixing, in an essentially fluid state, carboxylic acid comprising about 12–20% by weight of fatty acid diluent oil having viscosity of 100 to 700 SUS in a ratio of between 0.1:1 and 10:1 by weight, respectively, mixing thoroughly while heating to 200° F. to 280° F.;
   b. adding an alkali metal or alkaline earth metal hydroxide in amounts sufficient to saponify substantially all of the carboxylic acid;
   c. upon completion of saponification, adding waxes having melting point in the range of 50° to about 100° C. (in an amount of from about 0.5 to about 30% by weight based on the total weight of the formulation);
   d. after waxes are molten, cooling the mixture to the range of about 140° F. to 200° F.;
   e. mixing an alkali metal or alkaline earth metal sulfonate;
   f. adding dispersant;
   g. mixing thoroughly and cooling to the range of 80°–140° F.;
   h. adding sepiolite clay in the amount of 0.1 to about 10.0% by weight based on the total weight of the formulation and dispersing said sepiolite clay under high sheer agitation.

8. A method for coating solid substrates wherein said composition of claim 1 is applied to metal.

9. A method for coating solid substrates wherein said composition of claim 1 is applied by dipping.

10. A method for coating solid substrates wherein said composition of claim 1 is applied by brushing.

11. A method for coating solid substrates wherein said composition of claim 1 is applied by rolling.

12. A method for coating solid substrates wherein said composition of claim 1 is applied by spraying.

13. A manufacture comprising a substrate coated with a coating composition of claim 1.

14. A composition according to claim 1, comprising:
   a. about 0.5 to 30% by weight of component a.;
   b. about 1 to 98% by weight of component b.;
   c. about 0.1 to 10% by weight of component c.;
   d. about 1 to 98% by weight of component d.;
   e. at least 1% of component e.;
   f. about 0 to 90% by weight of component f.

* * * * *